Aug. 19, 1958 W. PECHY 2,848,094
CONTAINER FEEDING AND TRANSFER MECHANISM
Filed June 1, 1956 6 Sheets-Sheet 1
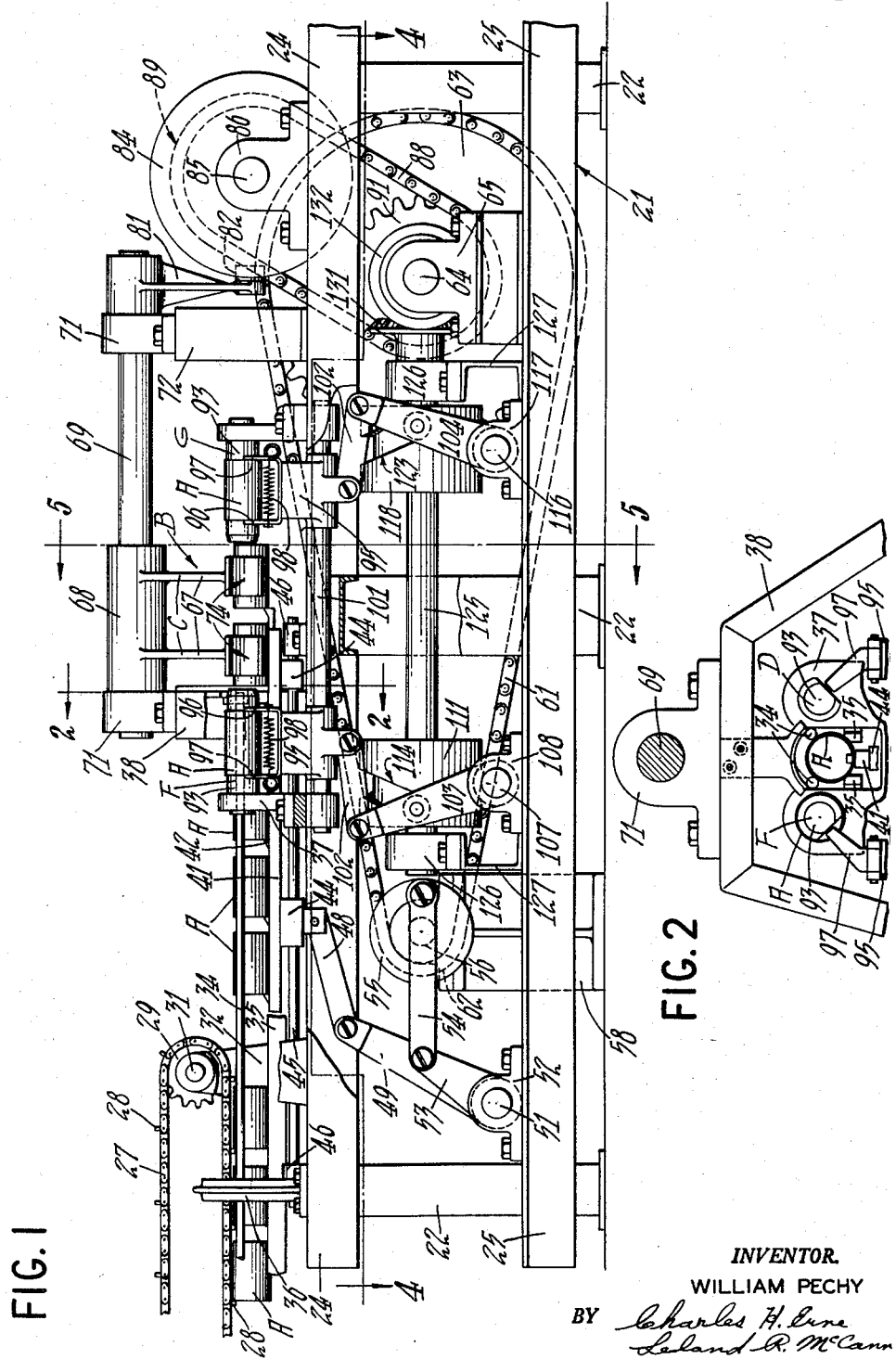
*INVENTOR.*
WILLIAM PECHY
BY Charles H. Ernes
Leland R. McCann
George W. Reiber
ATTORNEYS INVENTOR.
WILLIAM PECHY
BY Charles H. Erne
Leland R. McCann
George W. Reiber
ATTORNEYS Aug. 19, 1958 — W. PECHY — 2,848,094
CONTAINER FEEDING AND TRANSFER MECHANISM
Filed June 1, 1956 — 6 Sheets-Sheet 3

INVENTOR.
WILLIAM PECHY
BY Charles H. Erne
Leland R. McCann
George W. Reiber
ATTORNEYS INVENTOR.
WILLIAM PECHY
BY Charles H. Erne
Leland R. McCann
George W. Reiber
ATTORNEYS

*INVENTOR.*
WILLIAM PECHY
BY
ATTORNEYS

Aug. 19, 1958  W. PECHY  2,848,094
CONTAINER FEEDING AND TRANSFER MECHANISM
Filed June 1, 1956  6 Sheets-Sheet 6

INVENTOR.
WILLIAM PECHY
BY Charles H. Erne
Leland R. McCann
George W. Reiber
ATTORNEYS United States Patent Office 2,848,094
Patented Aug. 19, 1958

2,848,094

CONTAINER FEEDING AND TRANSFER MECHANISM

William Pechy, Belmar, N. J., assignor to American Can Company, New York, N. Y., a corporation of New Jersey Application June 1, 1956, Serial No. 588,736

10 Claims. (Cl. 198—19)

The present invention relates to a mechanism for feeding and transferring can bodies and the like and has particular reference to devices for feeding can bodies from a single lane into a plurality of lanes for subsequent operations and simultaneously receiving finished can bodies from the plurality of lanes for discharge from the mechanism.

An object of the instant invention is the provision of a can body feeding and transfer mechanism which permits of a high speed substantially continuous advancement of can bodies moving in processional order into and out of the mechanism while simultaneously providing for operations on the bodies at a slower rate of speed at predetermined work stations in the mechanism so as to provide for a general over-all high speed advancement of the can bodies from and to cooperating machines connecting with the mechanism as in a can body manufacturing line.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a mechanism embodying the instant invention, with parts broken away;

Fig. 2 is a fragmentary sectional view taken substantially along the line 2—2 in Fig. 1;

Figure 5:
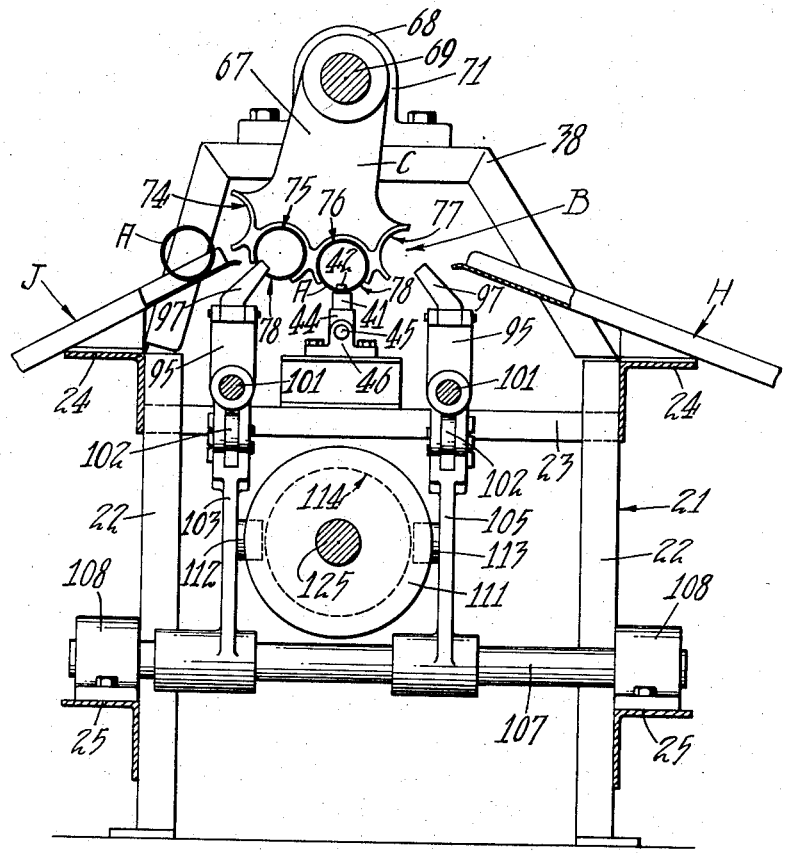
Figs. 5 and 6 are transverse sectional views taken substantially along the line 5—5 in Fig. 1, the two views illustrating certain of the movable parts in different positions.
Figure 6:
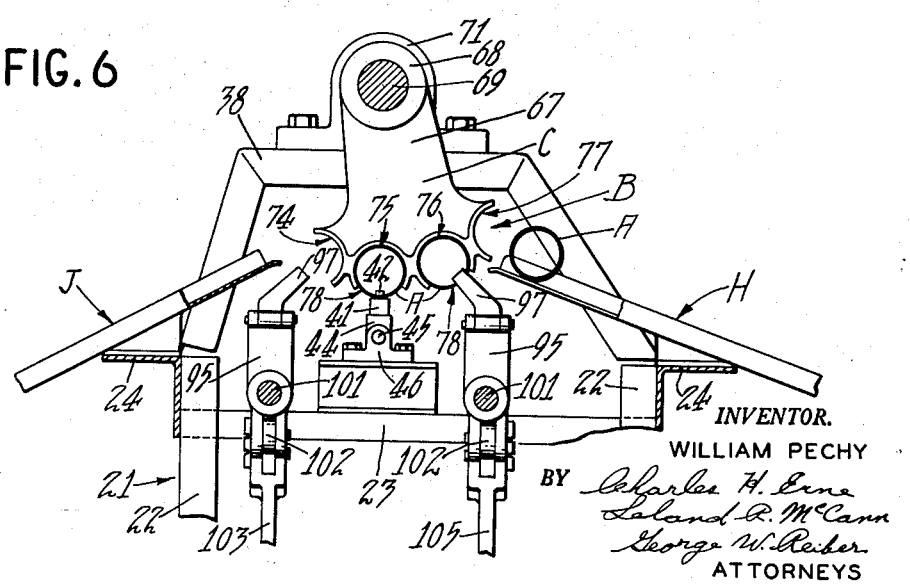
Figure 13:
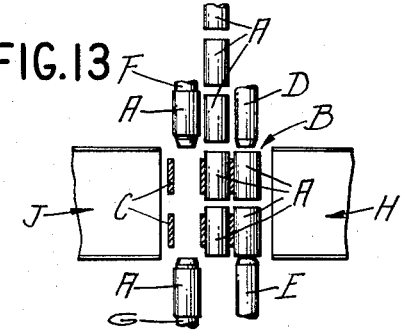
Figure 14:
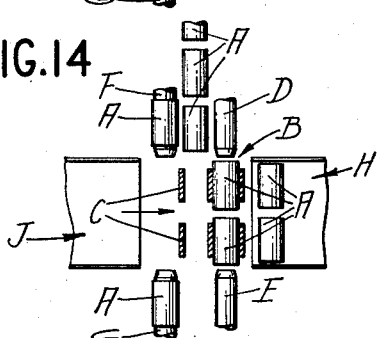
Figure 15:
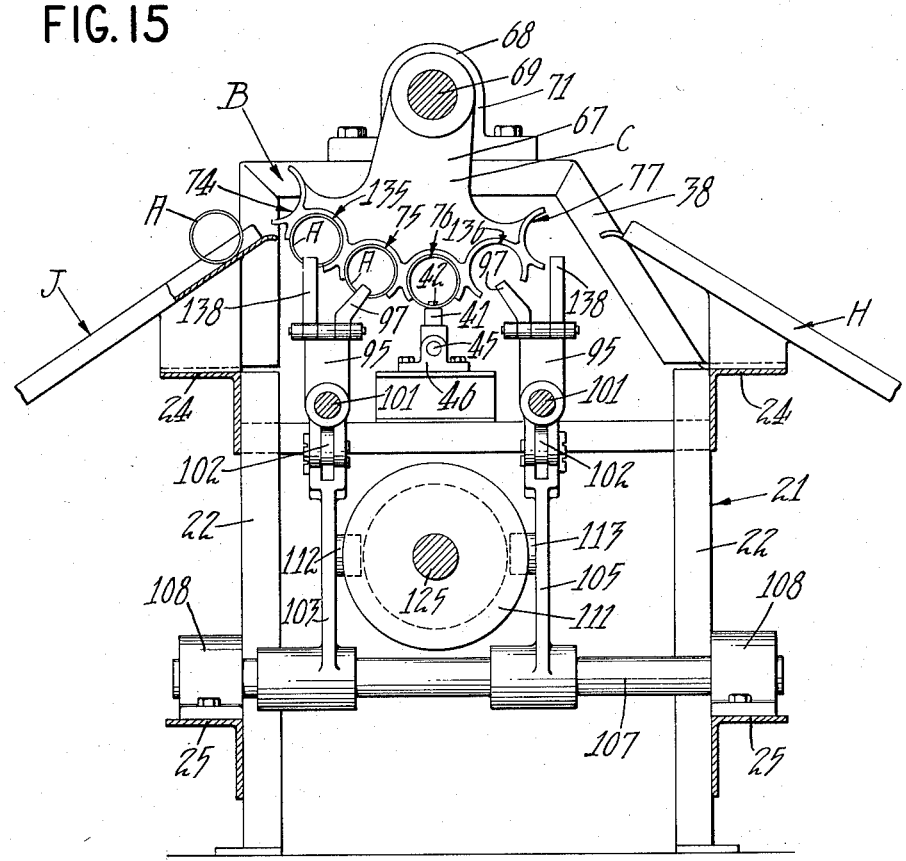
Figure 16:
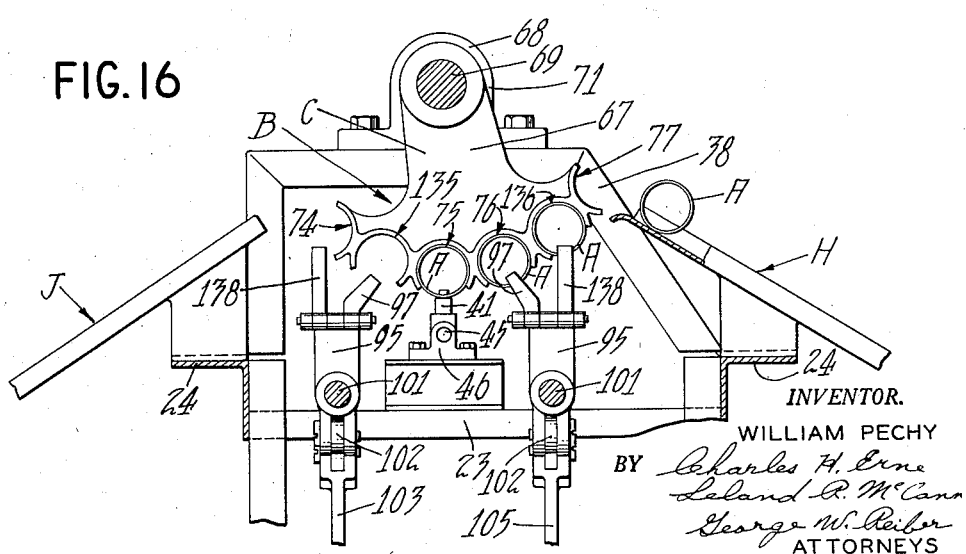

Figs. 7 to 14 inclusive are diagrammatic views of principal parts of the mechanism in different positions, illustrating various stages in the operation of the mechanism; and Figs. 15 and 16 are sectional views similar to Figs. 5 and 6 and illustrating a modified form of the invention.

As a preferred or exemplary embodiment of the instant invention the drawings illustrate a high speed feeding and transfer mechanism for advancing sheet metal tubular can bodies A along predetermined paths of travel at speeds of 500 bodies per minute and upward for the performance of an operation thereon and for discharge from the mechanism to other machines in a can manufacturing line for subsequent operations.

Figure 7:
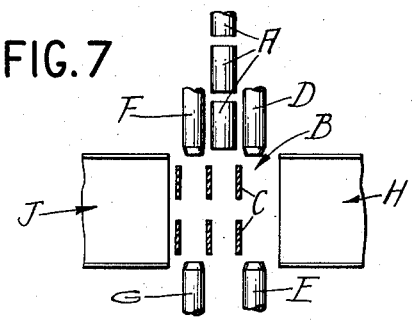
Figure 8:
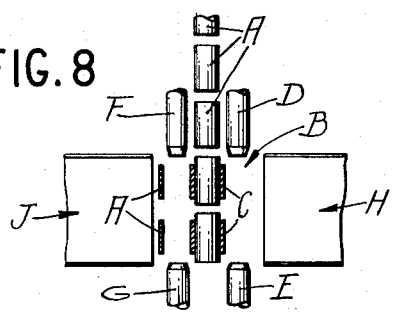

In operation the can bodies A enter the mechanism in a single line or lane in spaced and timed, end-to-end processional order traveling in a step-by-step or intermittent fashion toward a transfer station B (Fig. 7). At this transfer station B two can bodies A are advanced into a transfer device C as shown in Fig. 8, the transfer device being movable transversely of the mechanism across the entering path of travel of the bodies and having two portions which are alternately alignable with the entering lane. As soon as the two can bodies A are received in the transfer device C, this device shifts toward the right as shown in Fig. 9 to move the two can bodies laterally from the entering lane of bodies to a position in a second parallel lane where they are in endwise alignment with a pair of spaced working stations D, E (Fig. 9) located on opposite sides of the transverse path of travel of the transfer device C.

Figure 9:
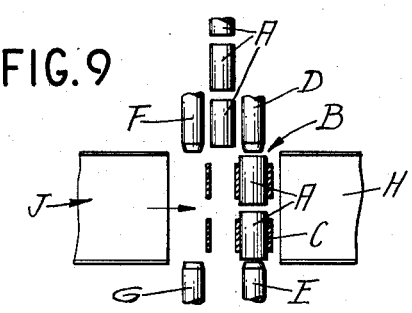
Figure 10:
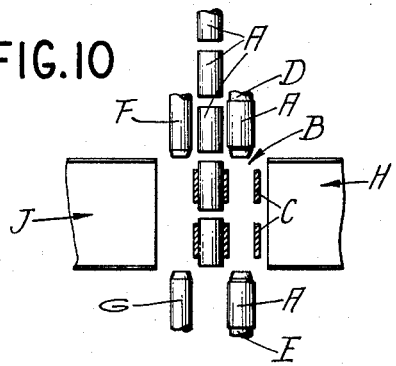

While the transfer device C is in this position (at the right as viewed in Fig. 9) a second set of two can bodies A is advanced from the entering lane into the transfer device in a position parallel with and along side of the first set and simultaneously with this action the two original or first set can bodies are shifted endwise in opposite directions out of the transfer device and along the second lane into the working stations D, E as best shown in Fig. 10. The removal of the first set of can bodies from one portion of the transfer device and the entrance of the second set into another portion of the transfer device leaves the transfer device holding the second set of bodies as shown in Fig. 10.

Figure 11:
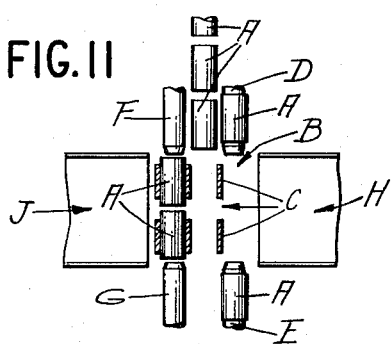

While the first set of bodies A are being operated on or treated at the work stations D, E, the transfer device C shifts toward the left from the position shown in Figs. 9 and 10 to the position shown in Fig. 11. In this position of the transfer device C the second set of two can bodies A are disposed in a third lane which is parallel to and to the left of the entrance lane. In this position said second set of two can bodies are in endwise alignment with a pair of spaced work stations F, G which are similar to the work stations D, E and similarly located relative to the path of travel of the transfer device C.

Figure 12:
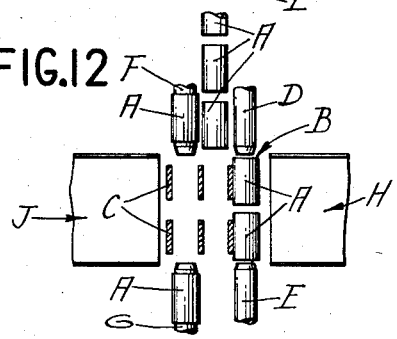

While the transfer device C is in this position with the second set of can bodies A in the third lane, three things happen simultaneously as shown in Fig. 12. First the second set of two can bodies A aligned with the work stations F, G are shifted endwise in opposite directions from the transfer device respectively into these work stations F, G thereby leaving this portion of the transfer device empty. Secondly the two first set bodies A at the work stations D, E having received their required operations or treatment are shifted endwise toward each other from the work stations D, E into adjacent endwise position alongside and in the path of travel of the transfer device C as shown in Fig. 12. Thirdly, a third set of two can bodies A is advanced from the single entering lane into position in the portion of the transfer device C which is aligned with the entering lane as shown in Fig. 13 while the transfer device is still in this position.

With the second set of two can bodies A at the work stations F, G to receive their respective operation, and with the third set of two can bodies in the transfer device, and with the first set of two can bodies in the second lane in the path of travel of the transfer device as shown in Fig. 13, the transfer device again shifts toward the right from the position shown in Fig. 13 to the position shown in Fig. 14. During this shift, the transfer device C engages the first set of two operated-upon can bodies A and pushes them laterally into a discharge chute H (Fig. 14) along which they roll from the mechanism to any suitable place of deposit for further advancement or treatment. This shift of the transfer device also moves the third set of can bodies now in the transfer device into the second lane as shown in Fig. 14, where they are in endwise alignment with the work stations D, E for transfer into these stations for a required operation in the same manner as hereinbefore described for the first set of can bodies just discharged. This completes the cycle of operations for the first set of two can bodies, from the entering lane into the second lane and into and return from the work stations D, E to the discharge chute H of the mechanism.

The same procedure is followed for the second set of can bodies which are now at the work stations F, G.

With the transfer device C in the position shown in Fig. 14, after discharging the first set of can bodies, the second set at the work stations F, G after receiving their operations are returned into endwise adjacent position as shown in Fig. 11, but alongside of and in the path of travel of the transfer device, while simultaneously the third set aligned with the work stations D, E are moved into these latter stations, and simultaneously with all of these movements a fourth set of can bodies is received from the entrance lane into the transfer device. The stage is thus set to complete the cycle of movements of the second set of can bodies. This is effected by the transfer device C shifting again toward the left from the position shown in Fig. 14 to that shown in Fig. 7. This shift of the transfer device discharges the second set of operated-upon can bodies from the mechanism by way of a discharge chute J which is similar to the chute H. This completes the cycle of movements for the second set of can bodies A and advances the cycle for the third set now at the work stations D, E and starts the cycle for the fourth set and reecives a new fifth set for its cycle of movements.

Thus through repeated transverse movements of the transfer device C, the can bodies A, in sets of two or pairs, are fed from the single entering lane of bodies into the transfer device and are positioned by this device into auxiliary lanes disposed on each side of the entering lane, and are fed along these auxiliary lanes into and out of working stations where they remain for a sufficient period of time to receive their operations, and are then discharged from the mechanism. Hence the feeding of the can bodies into and out of the mechanism may be accomplished at exceedingly high speeds without interfering with the high speed operation of connecting machines in the manufacturing line and still permit sufficient slower speed time at the working stations to accomplish the operations required to be performed on the can bodies.

In detail of construction the can body feeding and transfer mechanism is supported on a structural frame 21 (Figs. 1, 3, 4 and 5) which comprises a series of upright legs 22 tied together transversely by crossbars 23 and longitudinally by upper and lower angle beams or rails 24, 25 which extend the full length of the mechanism.

The can bodies A entering the mechanism in a single line or lane as hereinbefore mentioned are received from any suitable source of supply, for example, directly from a can body making machine and are propelled along a straight horizontal path of travel by an endless feed-in chain or conveyor 27 (Fig. 1) having spaced fingers or dogs 28 which engage behind the can bodies. The conveyor 27 is disposed above the path of travel of the can bodies and operates over a sprocket 29 mounted on a cross-shaft 31 carried in bearing brackets 32 which extend up from the upper angle beams or rails 24 of the frame 21. This conveyor 27 is actuated continuously in any suitable manner in time with the other moving parts of the mechanism.

The entering can bodies A are supported preferably in an outside horn comprising a pair of spaced upper guide rods 34 and a pair of spaced lower support rails 35 (Figs. 1 and 2) carried on brackets 36, 37 secured respectively to one of the frame crossbars 23 and to the frame rails 24 adjacent a bridge 38 supported on the frame rails. As the conveyor 27 advances the can bodies in their spaced end-to-end relation along the guide rods 34 and support rails 35, they are picked off at the end of the conveyor, two at a time and their advancement continued in the same straight line direction, by a reciprocating feed-bar 41 (Figs. 1, 2 and 3) having a series of spaced spring held feed fingers 42 engageable against the trailing edge of the bodies.

The feed-bar 41 is located below the path of travel of the can bodies, between the body support rails 35 and is mounted on a pair of slide blocks 44 (see Figs. 1 and 5) which surround a stationary slide bar 45. The ends of the slide bar 45 are secured in clamp blocks 46 attached to the frame 21. The feed-bar 41 is reciprocated through a feeding stroke (toward the right as shown in Fig. 1) and thence through a return stroke along the slide bar 45, by a link 48 (see also Fig. 4) which at one end is pivotally connected to one of the slide blocks 44. The other end of the link 48 is pivotally connected to the upper end of an upright actuating arm 49 carried on a rocker shaft 51 journaled at its ends in bearings 52 attached to the lower frame rails 25.

The shaft 51 and the arm 49 are rocked in time with the other moving parts of the mechanism by a short upright arm 53 which is integral with the arm 49. The outer end of this short arm 53 is connected by a link 54 to a crank disc 55 mounted on one end of a disc shaft 56 journaled in a pair of spaced bearings 57. One of the bearings 57 is attached to one of the frame rails 25 and the other bearing rests on a short separate column 58 disposed between the two frame rails 25. The disc shaft 56 is rotated continuously by an endless chain 61 (Figs. 1, 3, and 4) which operates over a sprocket 62 on the disc shaft 56 and over a sprocket 63 on a main driving shaft 64. The driving shaft 64 is journaled in a pair of spaced bearing blocks 65 supported on the lower frame rails 25. The shaft is rotated continuously in any suitable manner.

Figure 3:
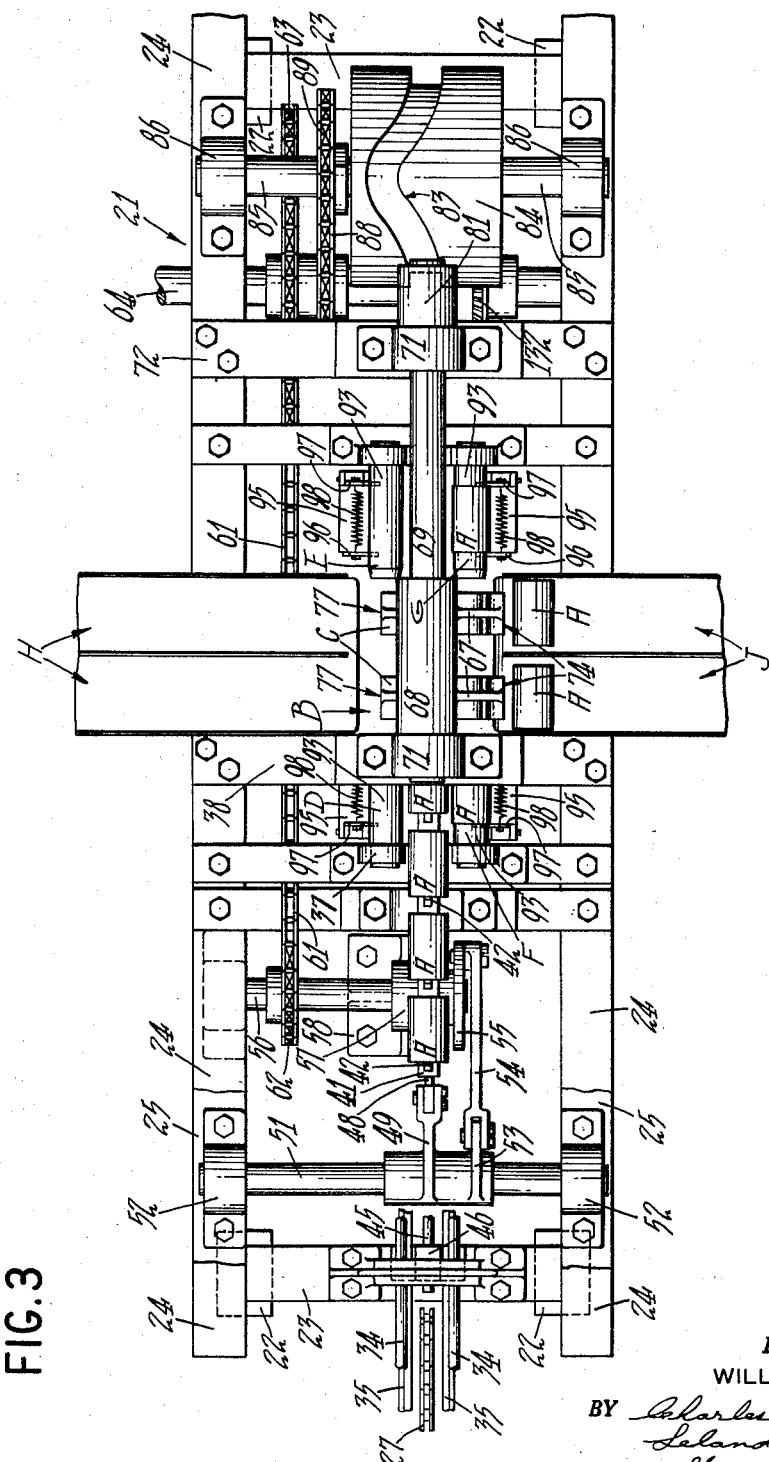
Fig. 3 is a plan view of the mechanism shown in Fig. 1, with parts broken away.
Figure 4:
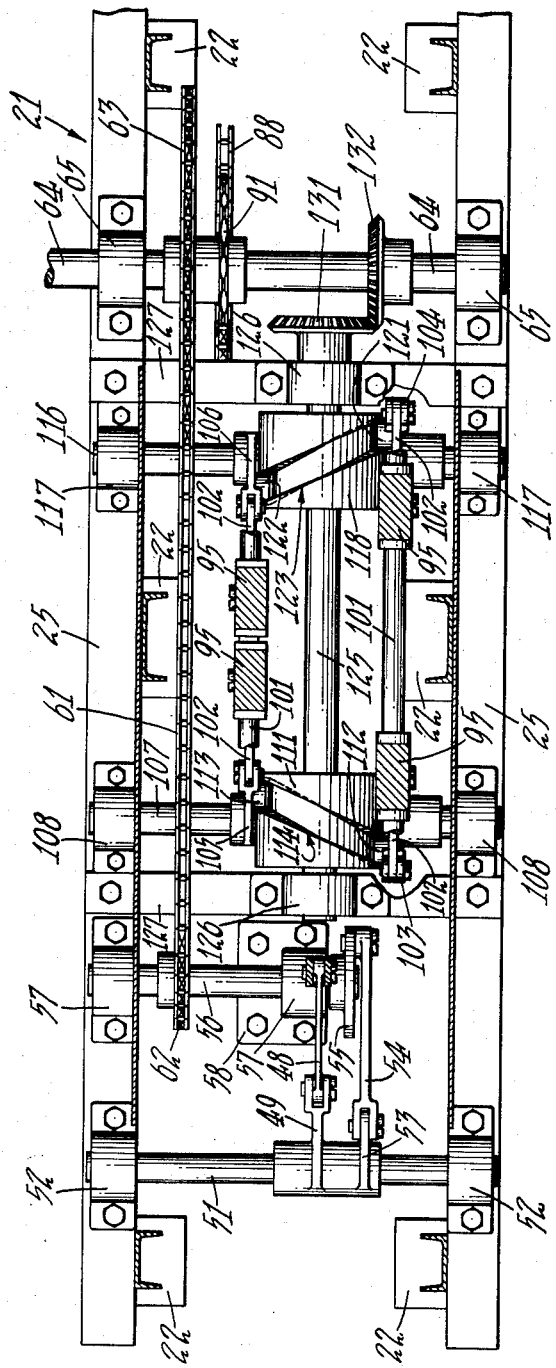
Fig. 4 is a horizontal sectional view taken substantially along the line 4—4 in Fig. 1.

The feed-bar 41 intermittently advances the entering can bodies A in pairs or sets of two adjacent longitudinally spaced bodies, along the entering lane, through two idle stations and then pushes the leading set of two can bodies into the transfer station B hereinbefore mentioned where the two bodies still in end-wise alignment are received in the transfer device C. The transfer device C as best shown in Figs. 1, 5 and 6, preferably comprises a pair of spaced depending pendulum arms 67 aligned one behind the other and formed on a common hub 68 secured to a horizontal longitudinally disposed rock shaft 69 located above the transfer station B. The ends of the shaft 69 are journaled in bearings 71 one of which is mounted on top of the bridge 38 and the other of which is mounted on a similar bridge 72 (Figs. 1 and 3).

The pendulum arms 67 of the transfer device C depend into the transfer station B and at their lower ends are formed with four adjacently disposed pockets 74, 75, 76, 77 (Figs. 5 and 6) arranged in an arc concentric with the axis of the rock shaft 69 and coincident with the axis of the can bodies advancing along the entrance lane. The two centrally located pockets 75, 76 are tubular in form but are provided with a longitudinal bottom opening 78 (Figs. 5 and 6). These two central pockets 75, 76 are alternately alignable with the entrance lane to receive the can bodies therefrom as the transfer device shifts laterally toward the right and left as hereinbefore explained. The two outer pockets 74, 77 preferably are half-mold pockets and are used to discharke the operated-upon or treated can bodies into the right-hand and left-hand discharge chutes H, J as hereinbefore described. The discharge chutes H, J are inclined and are disposed in transverse alignment with the transfer device C as best shown in Figs. 3, 5 and 6.

Transverse shifting of the transfer device C preferably is effected by swinging or rocking the pendulum arms 67 on the axis of the rock shaft 69. For this purpose the rock shaft 69 carries a depending rocker arm 81 (Figs. 1 and 3) which at its lower end supports a cam roller 82 which operates in a cam groove 83 of a barrel cam 84 mounted on a cross-shaft 85 journaled at its ends in bearings 86 secured to the upper frame rails 24. The cross-shaft 85 is rotated continuously in time with the other moving parts of the mechanism, by means of an endless chain 88 which operates over a sprocket 89 on the cross-shaft 85 and over a sprocket 91 on the main drive shaft 64.

The working stations D, E and F, G disposed on opposite sides of the path of travel of the transfer device C and in the two auxiliary lanes disposed in parallelism with and on opposite sides of the central entrance lane, preferably include short horns 93 (Figs. 1, 2 and 3) or other body supporting devices to hold the can bodies A while they are being operated upon at the working stations. The work performed at these stations may be of any suitable nature required in the manufacture of the bodies, such as operations performed on the side seams of the bodies, or flanging or beading or other operations on the ends of intermediate portions of the bodies. The horns 93 preferably are supported in the brackets 37 attached to the frame 21.

Shifting of the can bodies A endwise from the pockets 75, 76 of the transfer device C into position on the horns 93 at the working stations D, E and F, G preferably is effected by longitudinally reciprocable carriages 95 (Figs. 1, 2, 3, 4, 5 and 6). There are four carriages in all, one for each working station D, E, F, G and each carriage is arranged to reciprocate toward and away from its station. Each carriage 95 is formed with a fixed end wall or clamp finger 96 and a yieldable hinged wall or clamp finger 97 disposed in spaced relation thereto so as to receive and clamp a can body A endwise between them. A tension spring 98 stretched between the clamp fingers 96, 97 holds the hinged finger 97 in can body clamping position. These carriages 95 move into the path of travel of the transfer device C during their cycle of movement and receive the can bodies A directly from the transfer device by reason of the transfer device pushing the bodies laterally into the carriages when the transfer device shifts as shown in Figs. 5 and 6.

Reciprocation of the carriages 95 preferably is effected by cam action in time with the shifting of the transfer device C and in such a manner that the carriages in one of the auxiliary lanes move in the opposite direction to the carriages in the other of the auxiliary lanes. In this connection it will be recalled by reference to Fig. 12 that when two can bodies are located at the working stations F, G for their operations, there are two can bodies in the transfer device C in endwise alignment with their working stations D, E. All of these can bodies are clamped in their carriages 95, hence there are two carriages at stations F, G and two similar carriages are disposed adjacent the transfer device C ready to advance their can bodies into work stations D, E.

With the carriages 95 in these positions as in Fig. 12, their movement under cam action causes the two carriages at stations F, G to move toward each other and thereby remove the can bodies from stations F, G and hold them in discharge position adjacent the chute J. Simultaneously with this action the two carriages adjacent the transfer device C are moved apart and respectively toward the stations D, E to deliver their can bodies to these stations. For this purpose the carriages 95 are slidably mounted on a pair of horizontal longitudinally extending slide bars 101 (Figs. 1, 4, 5 and 6) disposed one on each side of the can body entrance lane in parallelism therewith. There are two carriages 95 on each slide bar 101. The carriages 95 are connected by separate links 102 to the upper ends of four upright actuating arms, the carriage for the working station F being connected to an arm 103, the carriage for station G being connected to an arm 104 and on the opposite side of the mechanism the carriage for station D being connected to an arm 105, and the carriage for station E being connected to an arm 106.

The two actuating arms 103, 105 for stations F and D are loosely mounted on a cross-shaft 107 the ends of which are carried in blocks 108 secured to the lower frame rails 25. These two arms 103, 105 are disposed on opposite sides of a common barrel cam 111 and carry cam rollers 112, 113 respectively which operate in a common groove 114 formed in the cam. Thus the single cam 111 actuates both arms 103, 105 and the groove 114 is shaped to actuate the arms simultaneously and in opposite directions.

In a similar manner and for the same purpose the two actuating arms 104, 106 for stations G and E are loosely mounted on a cross-shaft 116 the ends of which are carried in blocks 117 secured to the lower frame rails 25. These two arms 104, 106 are disposed on opposite sides of a common barrel cam 118 and carry cam rollers 121, 122 (Fig. 4) respectively which operate in a common groove 123 formed in the cam 118. This one cam 118 having the single cam groove 123 actuates both of the arms 104, 106 simultaneously and in opposite directions.

The two cams 111, 118 are mounted on a common horizontal longitudinally disposed cam shaft 125 which is journaled in bearing blocks 126 carried on crossbeams 127 of the frame 21. The cam shaft 125 is rotated continuously in time with the other moving parts of the machine through a bevel gear 131 which is carried on the cam shaft. This gear 131 meshes with and is driven by a bevel gear 132 carried on the main drive shaft 64.

Thus through the rotation of the two cams 111, 118 simultaneously the two carriage actuating arms 103, 104 and their carriages 95 are moved toward and away from each other and the two arms 105, 106 and their carriages 95 are moved in the same manner a half a cycle later, to effect the movement of one set of can bodies A into their working stations while effecting the removal of another set of can bodies A from their working stations in time with the transverse movement of the transfer device C.

As a modified form of the invention, Figs. 15 and 16 illustrate a mechanism similar to the preferred form with the exception that two auxiliary lanes each having two working stations are provided on each side of the entrance lane instead of only one. However it should be understood that the invention is unlimited in this respect and that any reasonable number of auxiliary lanes and working stations may be provided, depending upon the operations to be performed upon the can bodies.

In such a modification, the transfer device C not only transfers the bodies from the entrance lane to the next adjacent auxiliary lane, but also transfers the bodies from one auxiliary lane to another. For this purpose, the pendulum arms 67 of the transfer device C are provided with two additional pockets 135, 136 thus increasing the pockets to six instead of four.

In operation, the pendulum arms 67 still swing through the same arc and thus still cause the two middle pockets 75, 76 to register with the entrance lane alternately as in the preferred form. However the two pockets 75, 135 and the two pockets 76, 136 upon one shifting of the arms are unloaded simultaneously. For example when the pendulum arms 67, upon one shift, are in the position at the right as in Fig. 16, the two pockets 76, 136 are unloaded, the bodies being moved out of the pockets in opposite directions for insertion into the working stations in the two auxiliary lanes. After a shift of the arms to the left into the position shown in Fig. 15, the pocket 76 registers with the entrance lane, the pocket 136 registers with the first auxiliary lane, and the discharge pocket 77 registers with the second auxiliary lane. While in this position the can bodies at the working stations are reloaded into the pockets 136, 77 and a set of new bodies from the entrance lane is advanced into the pocket 76. Hence when the arms 67 again move to the right as in Fig. 16, the bodies in pocket 77 are discharged, the bodies in pocket 136 are advanced into the second auxiliary lane, and the bodies in pocket 76 are advanced into the first auxiliary lane. Thus the bodies are advanced from one auxiliary lane to the other, on both sides of the mechanism.

The bodies advanced into the auxiliary lanes are received in carriages for movement into the working stations as in the preferred form of the invention. Separate carriages may be provided for each of the auxiliary lanes if desired. However for the sake of simplicity, the drawings show the carriages 95 as in the preferred form with their clamp fingers 96, 97 serving the first auxiliary lanes and with additional clamp fingers 138 attached to the same carriages for the second auxiliary lanes. Thus the same rocker arms 103, 104, 105, 106 and cams 111, 118 as in the preferred form serve all of the auxiliary lanes in the modified form of the invention, and the can bodies are transferred from the fingers 96, 97 to the fingers 138 as the bodies are shifted from one lane to the other.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A mechanism for feeding and transferring can bodies, comprising in combination a can body entrance lane, a transfer station, an adjacently disposed auxiliary lane, a plurality of spaced working stations in alignment with said auxiliary lane, feeding means disposed adjacent said entrance lane for advancing can bodies therealong in a substantially continuous procession into said transfer station, a transfer device swingably mounted on a horizontal axis at said transfer station in longitudinal alignment with said entrance lane, said transfer device having a plurality of parallel pockets therein for alternately receiving from said entrance lane a plurality of adjacently disposed can bodies, means for swinging said transfer device on said horizontal axis from said entrance lane to said auxiliary lane to position said plurality of can bodies in said auxiliary lane, and means disposed adjacent said auxiliary lane for shifting the can bodies received therein in diverse directions into said working stations for the performance of an operation thereon.

2. A mechanism of the character defined in claim 1 wherein said last mentioned means comprises a plurality of carriers for respectively supporting and shifting said can bodies into said working stations and having actuating means for shifting said carriers.

3. A mechanism of the character defined in claim 2 wherein said carriers are reciprocable simultaneously in diverse directions to shift said can bodies from said transfer device into said working stations and to return said can bodies to a position in the path of travel of said transfer device, and wherein said transfer device is provided with means for engaging and discharging said returned can bodies from said auxiliary lane.

4. A mechanism of the character defined in claim 1 wherein said transfer device comprises a pivotally mounted depending arm movable through an arc transversely of said can body entrance lane and wherein said pockets are alternately alignable with said entrance lane and said auxiliary lane for receiving said can bodies from said entrance lane and for carrying them laterally to said auxiliary lane.

5. A mechanism of the character defined in claim 1 wherein said last mentioned means comprises a plurality of carriers for supporting and shifting said can bodies along said auxiliary lane into and out of said working stations, and wherein said transfer device comprises a pivotally mounted arm movable transversely through said transfer station and said pockets are alternately alignable with said entrance lane and said carriers in said auxiliary lane for transferring said can bodies from said entrance lane to said carriers.

6. A mechanism of the character defined in claim 5 wherein said pivotally mounted transfer arm is provided with a discharge element disposed adjacent a said pocket for engaging and discharging from said carriers treated can bodies returned from said working stations to empty said carriers for the reception of untreated can bodies disposed in said transfer arm pocket.

7. A mechanism of the character defined in claim 1 having a plurality of auxiliary lanes, each of said auxiliary lanes having a plurality of working stations spaced on each side of the path of travel of said transfer device and wherein said transfer device is movable between all of said lanes for receiving can bodies from said entrance lane and for transferring them to said auxiliary lanes.

8. A mechanism of the character defined in claim 7 wherein a pair of carriers are disposed adjacent each of said auxiliary lanes for supporting and shifting said can bodies along said auxiliary lanes into and out of said working stations and wherein means are provided to shift the carriers in one lane in an opposite direction from the carriers in an adjacent lane in time with the shifting of said transfer device to alternate the reception of can bodies by said auxiliary lanes.

9. A mechanism of the character defined in claim 7 wherein said plurality of auxiliary lanes are disposed on opposite sides of said entrance lane, and said transfer device is movable between said entrance lane and said auxiliary lanes alternately.

10. A mechanism of the character defined in claim 9 wherein said transfer device is provided with means for discharging treated can bodies from said auxiliary lanes alternately.

References Cited in the file of this patent

UNITED STATES PATENTS

| | | |
|---|---|---|
| 1,000,736 | Koerner | Aug. 15, 1911 |
| 1,288,962 | Moore | Dec. 24, 1918 |